No. 691,300. Patented Jan. 14, 1902.
J. TITUS, T. W. BURT, & D. D. SMITH.
REVERSING APPARATUS FOR PROPELLER SHAFTS.
(Application filed Feb. 25, 1901.)
(No Model.)
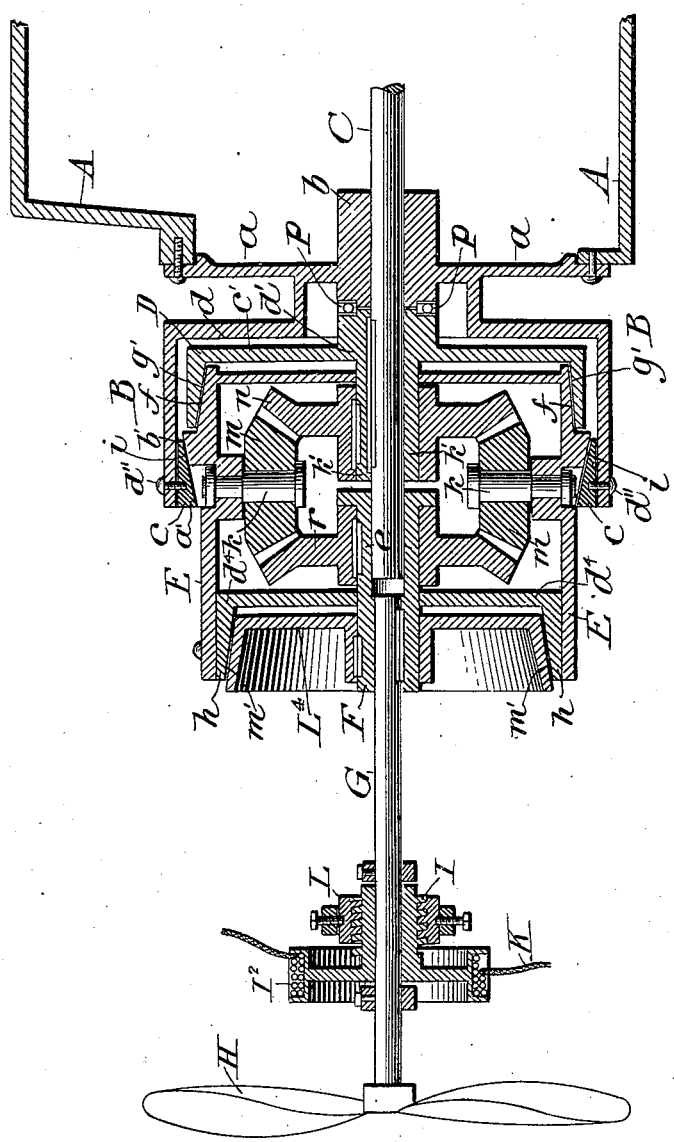
Witnesses:
Inventors.
John Titus
Townsend W. Burt
Daniel D. Smith
per James A. Whitney
Attorney

UNITED STATES PATENT OFFICE.

JOHN TITUS, TOWNSEND W. BURT, AND DANIEL D. SMITH, OF OYSTER BAY, NEW YORK, ASSIGNORS TO THE OYSTER BAY ENGINE COMPANY, A CORPORATION OF NEW YORK.

REVERSING APPARATUS FOR PROPELLER-SHAFTS.

SPECIFICATION forming part of Letters Patent No. 691,300, dated January 14, 1902.

Application filed February 25, 1901. Serial No. 48,761. (No model.)

*To all whom it may concern:*

Be it known that we, JOHN TITUS, TOWNSEND W. BURT, and DANIEL D. SMITH, citizens of the United States, and residents of Oyster Bay, in the county of Nassau and State of New York, have jointly invented certain new and useful Improvements in Reversing Apparatus for Propeller-Shafts, &c.; and we do hereby declare that the following is a full, clear, and exact description of the same, reference being had to the accompanying drawing, making a part of this specification, which is a longitudinal sectional view of an apparatus made according to our invention.

This invention is more especially intended for use on the propeller-shafts of steamships and other vessels driven by power, but may also be applied to other analogous uses. Its object is to provide a clutch mechanism connecting the propeller-shaft with the engine-shaft, with provision for readily and easily connecting and disconnecting the one from the other and also for reversing the motion of the propeller-shaft without reversing that of the engine-shaft.

The invention comprises certain new and useful combinations of parts whereby the objects above indicated are secured in a most effective and efficient manner.

A is a portion of an engine-frame which so far as concerns its relations with other parts of the apparatus is fixed or stationary. To this frame is fixed the supporting-plate $a$ of a cylindric shell B. Provided in suitable bearings, one of which is shown at $b$, is the shaft C of the engine, of which A is the frame, as just mentioned. The axis of this engine-shaft is in the axial line of the cylindric shell B. Fast in the inner periphery of said shell is a ring $c$, which for convenience we term a "tapered" ring, the same in cross-section being of taperal and wedge-like section, thinning in the direction of the engine-frame, as shown from $a'$ to $b'$ in the drawing. This ring may be provided in the shell by any suitable means—as, for example, by set-screws $d''$, or, if preferred, it may be made integral with the shell. Fast on the engine-shaft by means of a web $c'$ and hub $d'$, but to a slight extent slidable on said shaft, is a rim D, which is concentric with the engine-shaft and is keyed or otherwise made fast thereto, so as to rotate therewith. The inner periphery $g'$ of this rim is, so to speak, tapered or inclined in cross-section in a direction opposite to that of the taper in cross-section of the ring $c$, just hereinbefore described.

E is what we term a "drum," the webs of which $d^4$ $d^4$ are fitted one upon the cylindric hub $d'$ of the rim D and the other upon the part $e$ of the sleeve F, hereinafter presently described. The drum E is arranged to run loose upon its said supports—to wit, the hub $d'$ and the part $e$. The drum has at one of its ends an external tapering periphery $f$, which extends within and is opposite to the tapering internal surface $g'$ of the rim D. This drum has, further, at its opposite end an internal tapering periphery $h$, the taper or inclination of which is in a like direction to that of the external tapering periphery $f$ at its opposite end, as shown in the drawing. The drum has also an external peripheral inclined or wedge-like surface $l$, which projects within and, as hereinafter explained, acts in conjunction with the tapering ring $a'$ of the shell B. The drum at opposite points of its circumference is provided with short shafts $k$, upon each of which runs loosely a bevel-pinion $m$. Gearing with these pinions, at one side thereof, is a bevel-gear $n$, which is keyed fast to the hub $d'$ of the rim D.

G is the propeller-shaft the axis of which is coincident with that of the engine-shaft and which at its outer end carries a propeller H of any suitable kind. Upon this shaft is a winding-drum I², on which is an actuating-rope K, the purpose of which is hereinafter set forth. Loose on the shaft is also a screw I, which works in a fixed nut L, so that when the propeller-shaft revolves a longitudinal movement is given thereto. Fast on the propeller-shaft is the sleeve F, hereinbefore referred to, the said sleeve being extended over, but remaining loose in its relation to, the adjacent end of the engine-shaft C. Keyed on this sleeve is a bevel-gear $r$, which should correspond in shape and size to the bevel-gear $n$ and which gears with the two pinions $m$ $m$ at the sides of said pinions opposite those at which the bevel-gear $r$ gears with said pinions. Keyed to the sleeve F—in other words, fast to the propeller-shaft G—is a dish-shaped device $L^4$, which we term a "tapering annulus," the flaring or tapered rim $m'$ of which tapers in the same direction as and lies within the adjacent tapering inner periphery $h$ of the drum E. It will be observed that when the propeller-shaft is moved longitudinally inward toward the engine-frame the outer surface $m'$ of the device $L^4$ clutches with the inner surface of the periphery $h$ of the drum, while a further movement in the same direction by giving a longitudinal movement to the drum brings the annular circumferential surface $i$ away from tapering surface $a'$ $b'$ of the ring of the shell B and brings the surface $f$ of the drum into clutching-contact with the surface $g'$ of the rim D. The propeller-shaft is thus clutched direct to the engine-shaft to revolve therewith.

If now the propeller-shaft G, by means of the screw I, which works in the nut L, is moved longitudinally in an opposite direction—that is to say, outward—the tapering or wedge-like surface $m'$ will be brought away from the internal surface $h$ and that $f$ of the rim E will be brought away from that $g'$ of the rim D, thereby unclutching the propeller-shaft from the engine-shaft. Immediately succeeding this the surface $i$ clutches with surface $a'$ $b'$ of the ring G of the shell B, thereby holding fast the drum and bringing the shafts $k$ of the pinions $m$ to a fixed position, whereupon the engine-shaft revolving in the same direction as before and revolving the bevel-gear $n$, which is fast thereon, causes said gear to rotate the pinions $m$ $m$. These latter in their turn rotate the bevel-gear $r$, which is fast on the propeller-shaft, and thereby give rotation to the latter in a direction the opposite of that of the engine-shaft, thereby reversing the action of the propeller without changing the direction of rotation of the engine-shaft.

To prevent the propeller-shaft from thrusting the engine-shaft—in other words, to relieve the engine-shaft from thrust—the hub $d$ of the rim D is so keyed upon the engine-shaft as to permit a slight but sufficient movement along the said shaft. Interposed between the end of the hub $d'$ of the rim D and the adjacent end of the journal box or bearing $b$ is a ball-bearing $p$, which receives the endwise impact or pressure of the hub $d'$ of the rim and transmits such pressure to the bearing $b$, which in its turn is supported against the pressure by its fixed position or connection with the fixed engine-frame A, the ball-bearing reducing the friction between the aforesaid hub and the said bearing to a practically negligible degree.

It is of course to be understood that in the operation of reversing the propeller-shaft, as described, there is a position of the parts in the transition from the one motion to the other at which direct connection of the propeller-shaft with the engine-shaft through the clutching-surfaces $m'$ and $h$, &c., ceases before the mechanism, which includes the rim C and surface $i$, &c., comes into play, as described. At this point in said transition the propeller-shaft is free from the engine-shaft and may be held independent of the engine-shaft by suspending the movement through the screw I when the parts are in the above-indicated position. The inward movement of the propeller-shaft through the said screw may be given through the winding-drum $I^2$, actuated by the rope K. The backward longitudinal movement of the propeller-shaft naturally results from the drag of the propeller-blades in the water when the direct connection of the propeller-shaft to the engine-shaft is released. Consequently when the screw is in operation the action of the blades on the water tends to thrust the propeller-shaft inward, the office of the screw I being performed in the initial inward movement of the propeller-shaft.

What we claim as our invention is—

1. The combination with a driving-shaft and a driven shaft arranged to be operated thereby, a sleeve fast on the driven shaft and extended loose over the end of the driving-shaft, a fixed tapering ring concentric with the driving-shaft, a tapering annulus fast to and revoluble with the driven shaft, a tapering rim revoluble with the driving-shaft, a drum concentric with the axis of the two shafts, loose or independently revoluble around the latter and slidable with reference thereto, and interposed between the tapering rim and the tapering annulus, said drum having tapering clutching-surfaces which coöperate with those of the fixed ring, the rim, and the annulus aforesaid, of bevel-pinions carried by the drum, a bevel-gear revoluble with the driving-shaft and gearing with the pinions at one side thereof, a bevel-gear revoluble with the driven shaft and gearing with the opposite side of the pinions and means for giving an inward longitudinal movement to the driven shaft, whereby by such inward movement of the driven shaft it is clutched direct to the driving-shaft to revolve therewith, and by an outward movement of the driven shaft the same is released from the driving-shaft and then clutched thereto through the gears and pinions and revolved in a direction opposite to that of the revolutions of the driving-shaft, substantially as herein set forth.

2. The combination with a driving-shaft and a driven shaft arranged to be operated thereby, a sleeve fast on the driven shaft and extended loose over the end of the driving-shaft, a fixed tapering ring concentric with the axis of the driving-shaft, a tapering annulus fast to and revoluble with the driven shaft, a tapering rim revoluble with and slidable upon the driving-shaft, a drum concentric with the axis of the two shafts, loose or independently revoluble around the latter, slidable with reference thereto, and interposed between the tapering rim and the tapering annulus said drum having tapering clutching-surfaces which coöperate with those of the fixed ring, the rim and the annulus aforesaid, and bevel-pinions carried by the drum, of a bevel-gear revoluble with the driving-shaft and gearing with the pinions at one side thereof, a bevel-gear revoluble with the driven shaft and gearing with the opposite side of the pinions, a screw on the driven shaft, a fixed nut for said screw, and means for turning the driven shaft to insure a longitudinal movement of the shaft by the operation of the screw and nut, substantially as herein set forth.

3. The combination with a driving-shaft, a journal box or bearing for said shaft and a driven shaft arranged to be operated by said shaft, a sleeve fast on the driven shaft and extended over the end of the driving-shaft, a fixed tapering ring concentric with the driving-shaft, a tapering annulus revoluble with the driven shaft, a tapering rim revoluble with the driving-shaft and slidable thereon, a drum concentric with the two shafts loose or independently revoluble around the latter and slidable with reference thereto and interposed between the tapering rim and the tapering annulus, said drum having tapering clutching-surfaces which coöperate with those of the fixed ring, the rim, and the annulus aforesaid, of bevel-pinions carried by the drum, a bevel-gear revoluble with the driving-shaft and gearing with the pinions at one side thereof, a bevel-gear revoluble with the driven shaft and gearing with the opposite side of the pinions, a screw on the driven shaft, a fixed nut for said screw, a winding-drum and rope for turning the driven shaft to give it longitudinal movement, and ball-bearings interposed between the hub of the tapering slidable rim and the journal box or bearing of the driving-shaft, substantially as herein set forth.

JOHN TITUS.
TOWNSEND W. BURT.
DANIEL D. SMITH.

Witnesses:
JAMES H. LUDLAM,
EDWARD L. CHESHIRE.